Patented Dec. 19, 1939

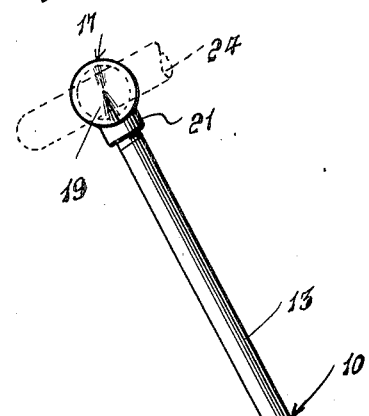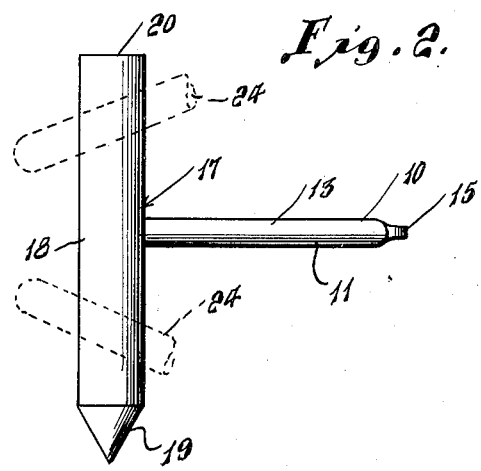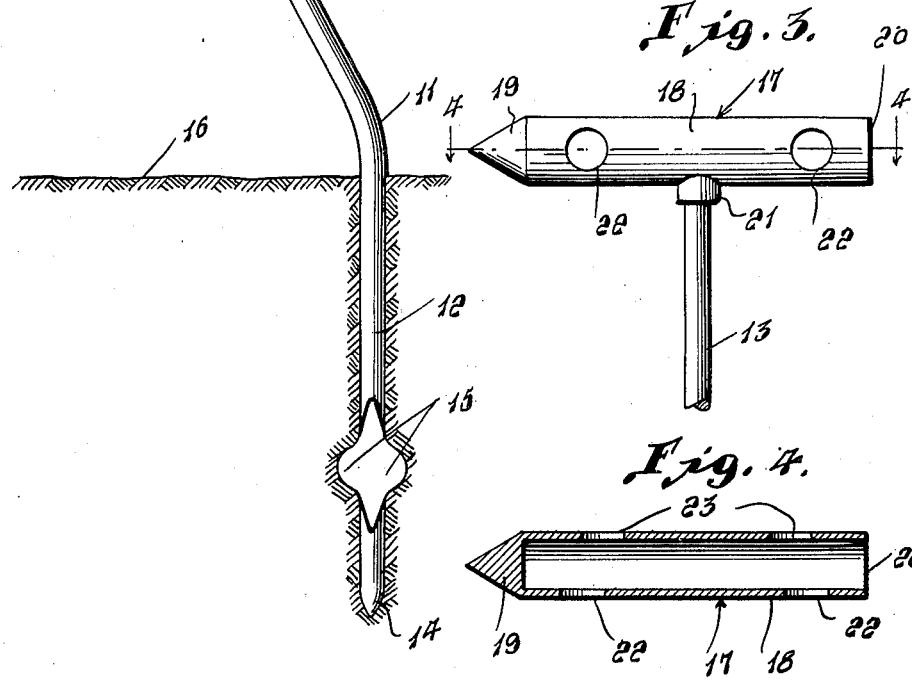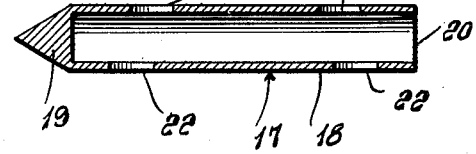

2,184,192

UNITED STATES PATENT OFFICE 2,184,192

FISHING ROD HOLDER

Bert A. McCline and Bill N. Kyser, Monclova, Ohio

Application January 19, 1939, Serial No. 251,803

2 Claims. (Cl. 248—44)

This invention relates to an improved holder adapted to be driven into the earth for supporting either one or two fishing rods.

It is a primary aim of this invention to provide a fishing rod holder of simple construction comprising a supporting spike adapted to be driven into the earth, and a detachable socket member for supporting either one or two fishing rods and for positioning the fishing rod or rods so that they will project upwardly and outwardly from said socket member.

Other objects and advantages of the invention will hereinafter become more fully apparent from the following description of the drawing, which illustrates a preferred embodiment thereof, and wherein:—

Figure 1 is a side elevational view showing the rod holder assembled with one end thereof embedded in the earth, Figure 2 is a top plan view of the device, Figure 3 is a fragmentary front elevational view of the upper portion thereof, and Figure 4 is a longitudinal sectional view taken along the line 4—4 of Figure 3.

Referring more particularly to the drawing, wherein like reference characters designate like or corresponding parts throughout the different views, 10 designates generally a rod which is bent intermediate of its ends at 11 to form the end portions 12 and 13 which are obliquely disposed relatively to each other. Portion 12 forms the spiked end of the rod 10 and is provided with the pointed or tapered end 14 which is adapted to be driven into the earth up to a point adjacent the bend 11. Portion 12, adjacent the end 14 is provided with the outwardly projecting flat portions 15 forming anchoring means adapted to hold the rod 10 in a fixed position when driven into the earth, as seen in Figure 1.

It will thus be seen that when the end 12 is driven straight into the earth the portion 13 will be disposed diagonally to the earth's surface, designated 16 for a purpose to be hereinafter described. A socket member, designated generally 17 is formed of a cylindrical body portion 18 having a closed end 19 and an open end 20. Formed integral with the body portion 18 and intermediate the ends thereof, is an outwardly projecting internally threaded coupling member 21 which is adapted to be detachably connected to the threaded upper end of the end portion 13 to removably mount the socket member 17 thereon. Body portion 18 is provided with the corresponding openings 22 and the corresponding openings 23 which are disposed substantially at right angles to the coupling member 21 which projects from the underside or bottom of the socket member 17, so that the openings 22 are formed in what constitutes the front of the socket member and the openings 23 are formed in the back thereof. The openings 22 are spaced a greater distance apart than the openings 23 and these openings are both cut diagonally so that the openings 22 and 23 at each end of the socket member 17 are diagonally alined to form with the hollow interior of said member a continuous straight passage therethrough adapted to receive the butt 24 of a fishing rod, not shown, as best seen in Figure 2.

From the foregoing it will be seen that the parts may be assembled, as illustrated in Figure 1 so that the passages formed by the pairs of openings 22 and 23 will be inclined upwardly and outwardly relatively to each other to receive and engage the butts 24 of two fishing rods which will thereby be held in upwardly and outwardly diverging relationship so that their tips will be elevated relatively to their butt ends and spaced a substantially greater distance apart. The device when used in this manner is adapted for holding two fishing rods and the socket member 17, as best illustrated in Figure 2, is disposed transversely to the rod 10. If only one fishing rod is to be held the socket member 17 is turned through an arc of 90° so that it is disposed in a plane with rod 10 and so that the open end 20 is projecting upwardly. One of the butts 24 can then be inserted in the open end 20 to rest against the closed end 19 to be supported thereby in the socket member 17 to support a fishing rod diagonally to the earth's surface 16 with its tip elevated.

Various modifications and changes in the precise construction and arrangement of the parts forming the invention are contemplated and may obviously be resorted to, and the right is therefore expressly reserved to make such variations and changes as fall within the spirit and scope of the invention as hereinafter defined by the appended claims.

We claim as our invention:

1. A fishing rod holder comprising a stake having a pointed end adapted to be embedded in the ground, said stake being provided with anchoring means adjacent said pointed end, the opposite end of said stake being bent to project at substantially an oblique angle to said first mentioned end, a cylindrical socket member having a closed end and adapted to receive the butt of a fishing rod, a coupling member formed integral with said socket member intermediate of its ends for engagement with the last mentioned end of said stake, said socket member being provided with pairs of opposed spaced openings, adjacent its opposite ends, each pair of said openings being adapted to receive and engage a butt of a fishing rod, and the openings of said pairs being diagonally arranged relatively to each other to support the rods in outwardly diverging relationship.

2. A holder for fishing rods comprising a stake having a pointed end adapted to be embedded in the earth, the opposite end of said stake being bent and adapted to be disposed at substantially an oblique angle to the earth's surface, said last mentioned end being threaded, a cylindrical socket member having a closed end, and a coupling element formed integral therewith and disposed intermediate the ends thereof, said coupling element being internally threaded to detachably connect the socket member and stake and to position the socket member with its open end extending upwardly to receive the butt end of a fishing rod, and said socket member being provided with pairs of oppositely disposed openings, adjacent its ends, the openings in the opposite sides of said socket member being at different spaced intervals to form pairs of diagonal passages through said member adapted to receive the butt ends of fishing rods for mounting them in diverging relationship, said socket member being adjustable relatively to the stake to position its ends in substantially a horizontal plane with said passages diverging outwardly and upwardly.

BERT A. McCLINE.
BILL N. KYSER.